US012168888B1

(12) United States Patent
Ewing

(10) Patent No.: US 12,168,888 B1
(45) Date of Patent: Dec. 17, 2024

(54) DEADBOLT COVERING DEVICE

(71) Applicant: Marlon Ewing, Chicago, IL (US)

(72) Inventor: Marlon Ewing, Chicago, IL (US)

( * ) Notice: Subject to any disclaimer, the term of this patent is extended or adjusted under 35 U.S.C. 154(b) by 0 days.

(21) Appl. No.: 18/211,564

(22) Filed: Jun. 19, 2023

(51) Int. Cl.
*E05B 1/00* (2006.01)
*E05B 17/00* (2006.01)

(52) U.S. Cl.
CPC .......... *E05B 17/002* (2013.01); *E05B 1/0061* (2013.01)

(58) Field of Classification Search
CPC ...... E05B 1/0053; E05B 1/0007; E05B 1/003; E05B 1/0061; E05B 1/0015; E05B 17/002; E05B 16/412–413; E05B 16/435; E05B 16/11
See application file for complete search history.

(56) References Cited

U.S. PATENT DOCUMENTS 2,753,911 A * 7/1956 Haslett .................. E05B 1/0061 16/86 A
D211,398 S * 6/1968 Hall ............................... D8/310
4,082,351 A * 4/1978 Chrones ................ E05B 13/001 16/DIG. 30
4,226,104 A 10/1980 Oliver
4,700,556 A 10/1987 Wade, Sr.
4,858,454 A 8/1989 McAnulty, III
D329,590 S * 9/1992 Chapman ....................... D8/402
5,201,202 A 4/1993 Kam
5,423,583 A * 6/1995 Crockom .............. E05B 13/001 70/424
5,560,235 A * 10/1996 Aucoin ................. E05B 13/001 70/168
5,615,567 A 4/1997 Kemp
5,746,078 A 5/1998 Kiernan
5,933,915 A * 8/1999 El Dessouky ............ E05F 5/06 16/86 A
6,237,440 B1 * 5/2001 Lebelo ..................... G05G 1/10 137/315.15
D618,084 S 6/2010 Karabatsos
8,756,965 B1 * 6/2014 Anderson ............. E05B 13/001 292/264
9,349,514 B2 5/2016 Taylor
10,422,157 B1 * 9/2019 Lindstead ............. E05B 1/0053
D957,910 S * 7/2022 Saxon ............................ D8/322
(Continued)

FOREIGN PATENT DOCUMENTS

CA 2199460 9/1998
CN 104903525 A * 9/2015 ............. B21D 22/20
(Continued)

*Primary Examiner* — Chuck Y Mah

(57) ABSTRACT

A deadbolt covering device includes a first cup that is positionable over a deadbolt of a door to inhibit condensation from collecting within the deadbolt and subsequently rendering the deadbolt inoperable due to freezing. A first cover is movably attached to the first cup to enclose the deadbolt or expose the deadbolt. A second cup is positionable over a doorknob of the door to inhibit condensation from collecting within the doorknob and subsequently rendering the doorknob inoperable due to freezing. A second cover is movably attached to the second cup to enclose the doorknob or expose the doorknob. A member is coupled between the first cup and the second cup such that the first cup and the second cup are spaced apart from each other.

9 Claims, 7 Drawing Sheets

(56) References Cited

U.S. PATENT DOCUMENTS

| | | | | |
|---|---|---|---|---|
| 2006/0006678 | A1* | 1/2006 | Herron | E05B 1/0069 292/336.3 |
| 2006/0059663 | A1* | 3/2006 | D'Ambrosio | E05B 1/0069 16/441 |
| 2006/0202484 | A1* | 9/2006 | Lignell | E05B 13/001 292/336.3 |
| 2008/0314103 | A1 | 12/2008 | Corlija | |
| 2014/0150211 | A1* | 6/2014 | Bracey | E05B 1/0069 16/110.1 |
| 2015/0026926 | A1* | 1/2015 | Storey | E05B 17/14 16/402 |
| 2022/0162880 | A1* | 5/2022 | Waxmundsky | E05B 1/0061 |
| 2022/0307288 | A1* | 9/2022 | Woods, Jr. | E05B 17/186 |

FOREIGN PATENT DOCUMENTS

| | | | | |
|---|---|---|---|---|
| JP | 2003097101 | A | * | 4/2003 |
| KR | 100858445 | B1 | * | 9/2008 |

* cited by examiner

DEADBOLT COVERING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYMEMBER

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to deadbolt devices and more particularly pertains to a new deadbolt device for protecting a deadbolt and a doorknob from condensation which could render the deadbolt and the doorknob inoperable due to freezing. The device includes a first cup that is positionable around a deadbolt, a second cup that is positionable around a doorknob and a member extending between the first cup and the second cup.

(2) Description of Related Art Including Information Disclosed Under 37 CFR 1.97 and 1.98

The prior art relates to deadbolt devices including a variety of door lock covering devices that each includes a cover which is positionable over a lock on a door for protecting the lock from the elements thereby inhibiting the lock from freezing. In no instance does the prior art disclose a door lock covering device that includes a pair of cups that each covers a respective deadbolt and a doorknob on a door and a member that extends between the pair of cups.

BRIEF SUMMARY OF THE INVENTION

An embodiment of the disclosure meets the needs presented above by generally comprising a first cup that is positionable over a deadbolt of a door to inhibit condensation from collecting within the deadbolt and subsequently rendering the deadbolt inoperable due to freezing. A first cover is movably attached to the first cup to enclose the deadbolt or expose the deadbolt. A second cup is positionable over a doorknob of the door to inhibit condensation from collecting within the doorknob and subsequently rendering the doorknob inoperable due to freezing. A second cover is movably attached to the second cup to enclose the doorknob or expose the doorknob. A member is coupled between the first cup and the second cup such that the first cup and the second cup are spaced apart from each other.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
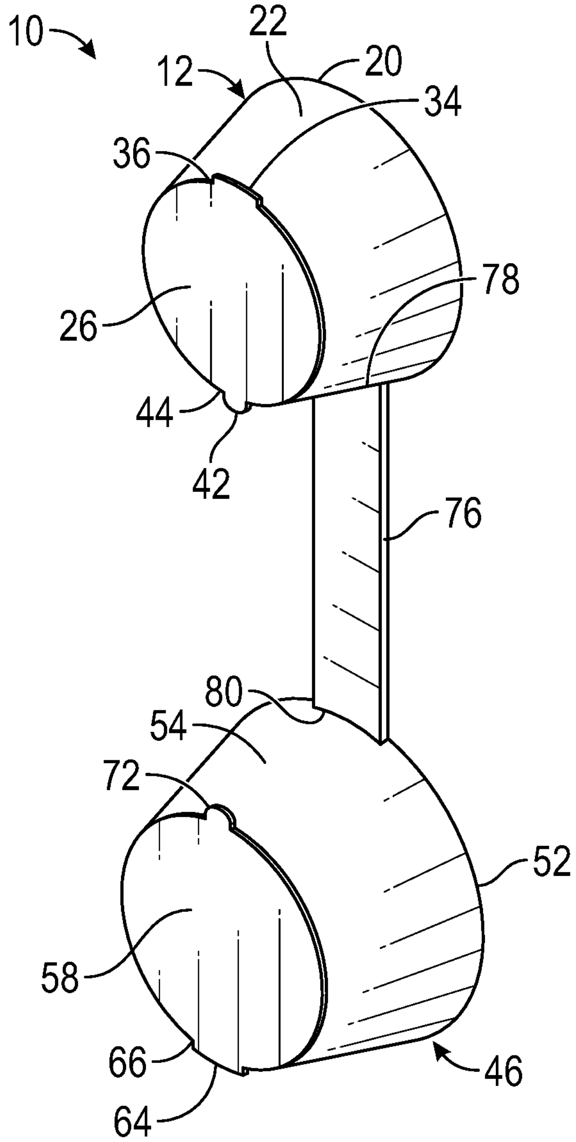
FIG. 1 is a front perspective view of a deadbolt covering device according to an embodiment of the disclosure.
Figure 2:
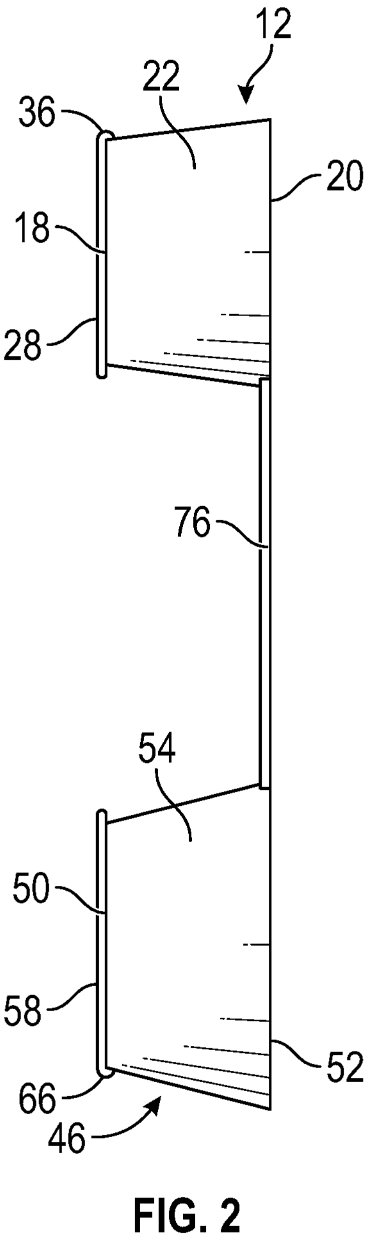
FIG. 2 is a right side view of an embodiment of the disclosure.
Figure 3:
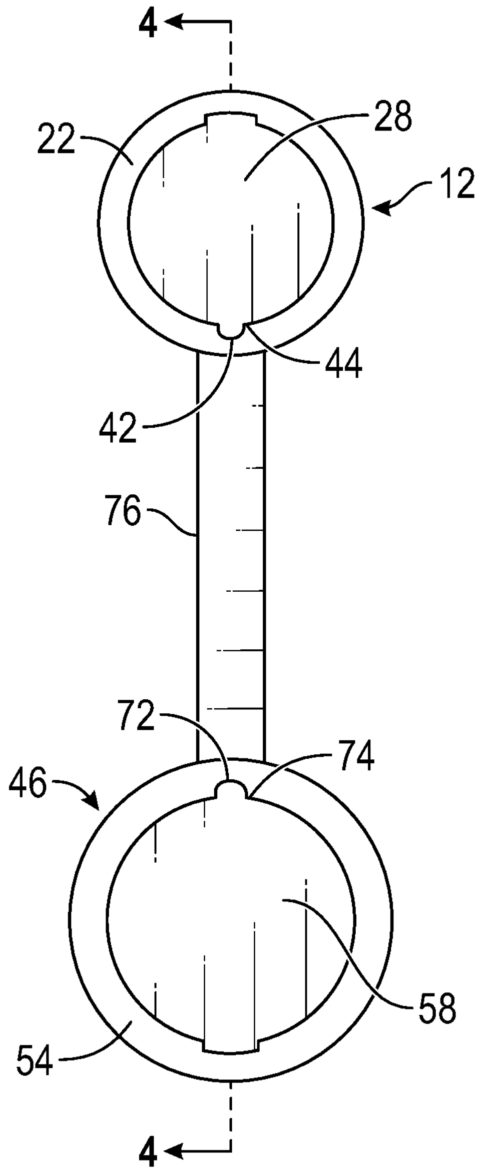
FIG. 3 is a front view of an embodiment of the disclosure.
Figure 4:
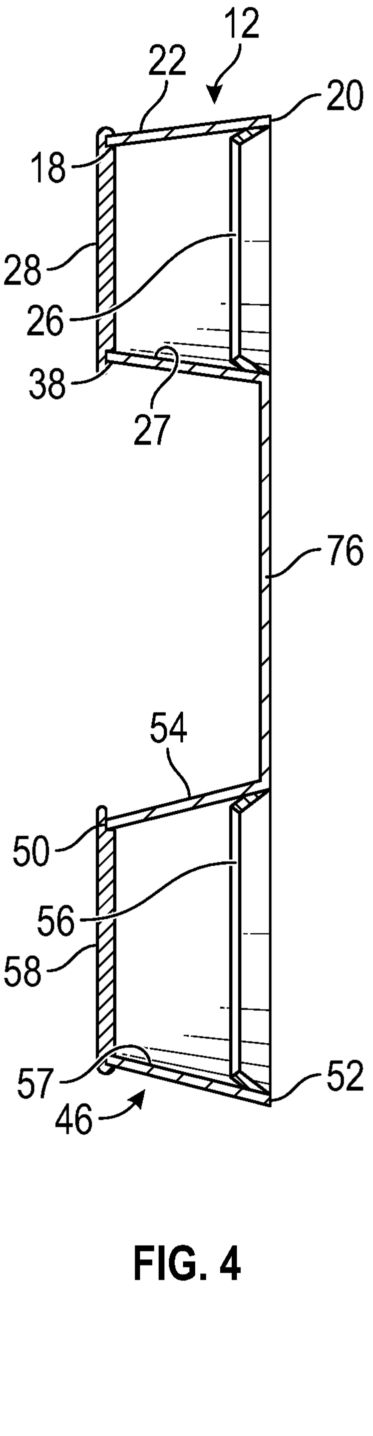
FIG. 4 is a cross sectional view taken along line 4-4 of FIG. 3 of an embodiment of the disclosure.
Figure 5:
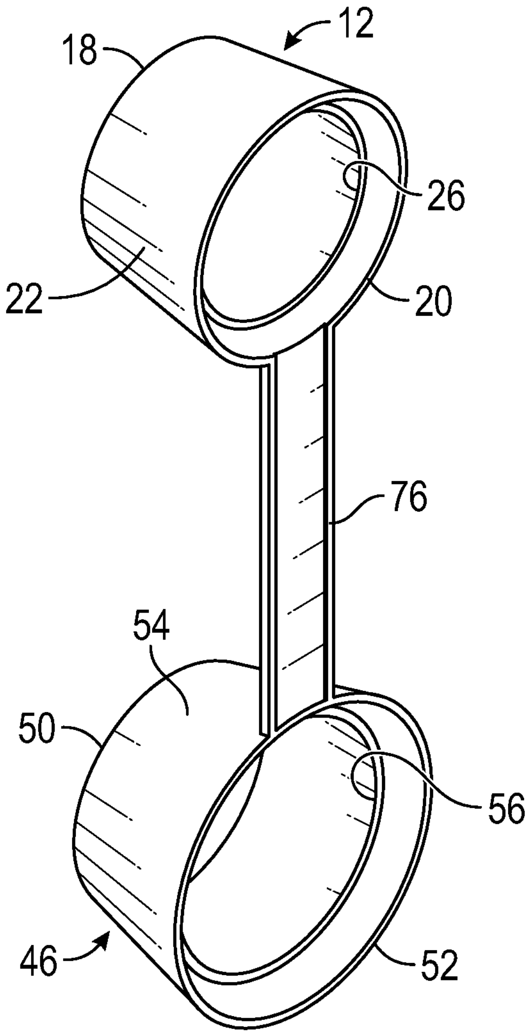
FIG. 5 is a back perspective view of an embodiment of the disclosure.
Figure 6:
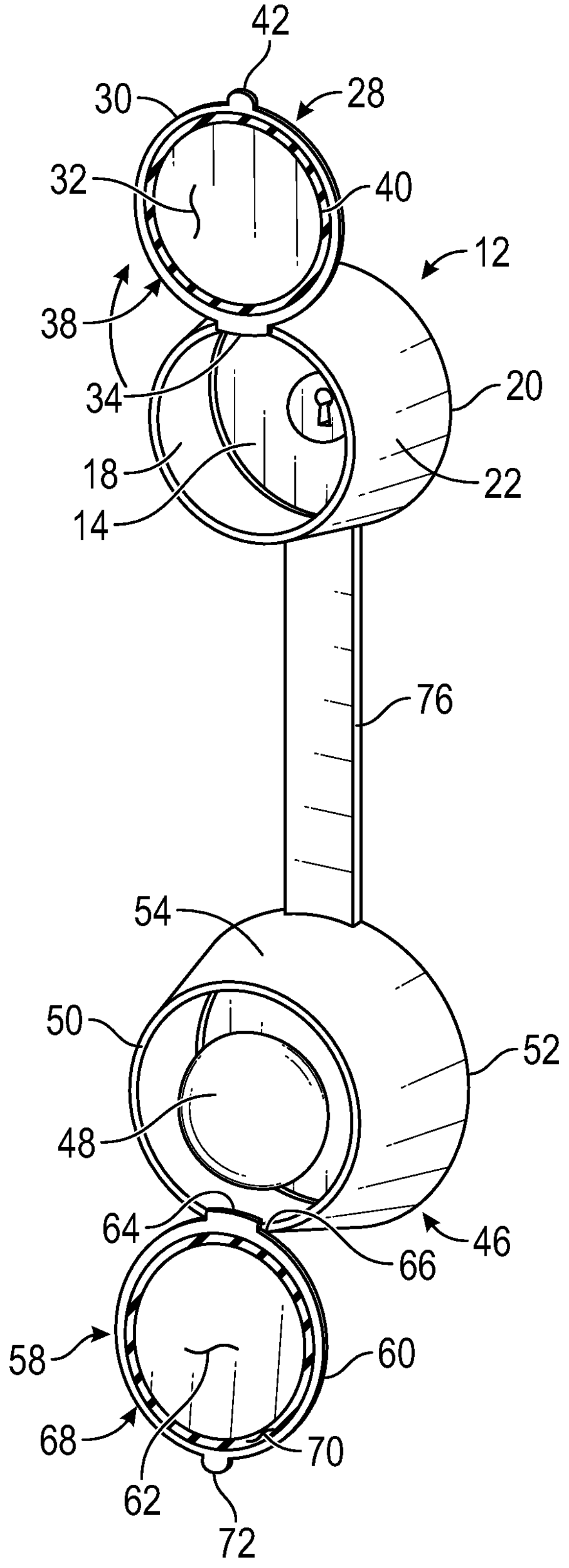
FIG. 6 is a front perspective view of an embodiment of the disclosure showing a first cover and a second cover in an open position.
Figure 7:
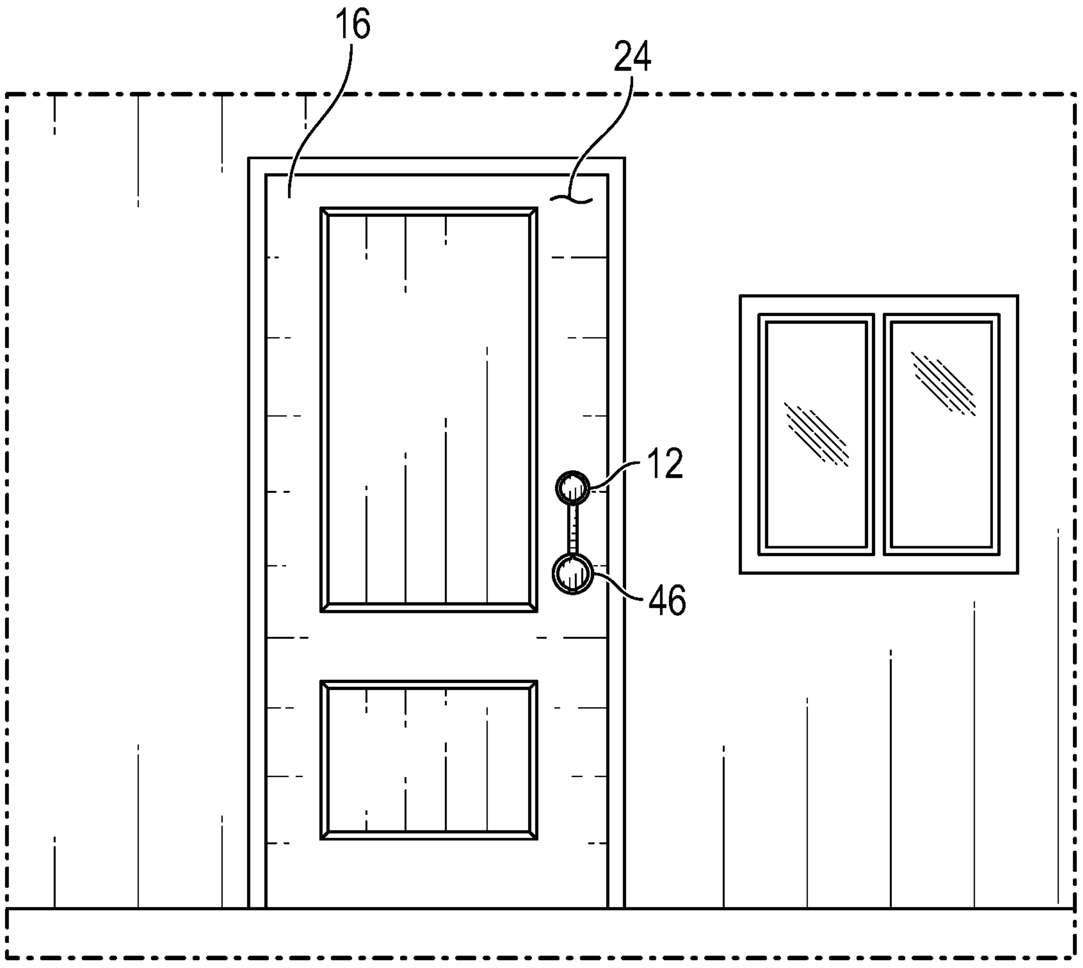
FIG. 7 is a perspective in-use view of an embodiment of the disclosure.

With reference now to the drawings, and in particular to FIGS. 1 through 7 thereof, a new deadbolt device embodying the principles and concepts of an embodiment of the disclosure and generally designated by the reference numeral 10 will be described.

As best illustrated in FIGS. 1 through 7, the deadbolt covering device 10 generally comprises a first cup 12 that is positionable over a deadbolt 14 of a door 16. The door 16 may be an exterior door of a house, for example, or any other type of man door in a building that is exposed to the elements of weather. The first cup 12 is comprised of a fluid impermeable material, including but not being limited to rubber or silicone, to inhibit condensation from collecting within the deadbolt 14 and subsequently rendering the deadbolt 14 inoperable due to freezing. The first cup 12 has a front end 18, a back end 20 and an outside wall 22 extending between the front end 18 and the back end 20. Furthermore, each of the front end 18 and the back end 20 is open thereby facilitating the back end 20 to insertably receive the deadbolt 14 having the back end 20 resting against an outside surface 24 of the door 16 such that the outside wall 22 surrounds the deadbolt 14. The outside wall 22 angles inwardly between the back end 20 and the front end 18 such that the first cup 12 has a frusto-conical shape.

The first cup 12 has a first flap 26 extending away from an inside surface 27 of the outside wall 22 and the first flap 26 extends around a full circumference of the outside wall 22. The first flap 26 is positioned closer to the back end 20 than the front end 18. The first flap 26 angles toward the front end 18 such that the first flap 26 frictionally engages the deadbolt 14 thereby inhibiting the first cup 12 from being removed from the deadbolt 14. The first flap 26 is comprised of a deformable material, including but not being limited to rubber or silicone, thereby facilitating the first cup 12 to be removed from the deadbolt 14 when sufficient force is applied to the first cup 12 to pull the first cup 12 away from the deadbolt 14. The back end 20 of the first cup 12 has a diameter of at least 5.0 cm to accommodate the diameter of a typical deadbolt 14.

A first cover 28 is provided and the first cover 28 is movably attached to the first cup 12. The first cover 28 is positionable in a closed position thereby facilitating the first cover 28 and the first cup 12 to enclose the deadbolt 14. Conversely, the first cover 28 is positionable in an open position thereby exposing the deadbolt 14. The first cover 28 is comprised of a fluid impermeable material, including but not being limited to rubber or silicone, to inhibit condensation from collecting within the deadbolt 14 and subsequently rendering the deadbolt 14 inoperable due to freezing.

The first cover 28 has an outer edge 30 and a rear surface 32 and the outer edge 30 is attached to the front end 18 of the first cup 12 at an attachment point 34 located at a top end 36 of the outer edge 30 of the first cover 28. The first cover 28 has a groove 38 that is recessed into the rear surface 32 of the first cover 28 and the groove 38 extends around a full circumference of the outer edge 30 of the first cover 28. The groove insertably receives the front end 18 of the first cup 12 when the first cover 28 is closed such that a lateral bounding surface 40 of the groove 38 frictionally engages the inside surface 27 of the outside wall 22 of the first cup 12. In this way the first cover 28 is retained in the closed position. The first cover 28 has a first lobe 42 which extends away from the outer edge 30 of the first cover 28 thereby facilitating the first lobe 42 to be gripped for urging the first cover 28 into the open position. Furthermore, the first lobe 42 is aligned with a bottom end 44 of the outer edge 30.

A second cup 46 is provided and the second cup 46 is positionable over a doorknob 48 of the door 16. The second cup 46 is comprised of a fluid impermeable material to inhibit condensation from collecting within the doorknob 48 and subsequently rendering the doorknob 48 inoperable due to freezing. The second cup 46 has a forward end 50, a rear end 52 and an outer wall 54 extending between the forward end 50 and the rear end 52. Each of the forward end 50 and the rear end 52 is open thereby facilitating the rear end 52 to insertably receive the doorknob 48 having the rear end 52 resting against the outer surface of the door 16 such that the outer wall 54 surrounds the doorknob 48. The outer wall 54 angles inwardly between the rear end 52 and the forward end 50 such that the second cup 46 has a frusto-conical shape.

The second cup 46 has a second flap 56 extending away from an inside surface 57 of the outer wall 54 and the second flap 56 extends around a full circumference of the outer wall 54. The second flap 56 is positioned closer to the rear end 52 than the forward end 50. The second flap 56 angles toward the forward end 50 such that the second flap 56 frictionally engages the doorknob 48 thereby inhibiting the second cup 46 from being removed from the doorknob 48. The second flap 56 is comprised of a deformable material thereby facilitating the second cup 46 to be removed from the doorknob 48 when sufficient force is applied to the second cup 46 to pull the second cup 46 away from the doorknob 48.

A second cover 58 is movably attached to the second cup 46 and the second cover 58 is positionable in a closed position thereby facilitating the second cover 58 and the second cup 46 to enclose the doorknob 48. The second cover 58 is comprised of a fluid impermeable material, including but not being limited to rubber or silicone, to inhibit condensation from collecting within the doorknob 48 and subsequently rendering the doorknob 48 inoperable due to freezing. The second cover 58 is positionable in an open position thereby exposing the doorknob 48. The second cover 58 has an outside edge 60 and a back surface 62 and the outside edge 60 is attached to the forward end 50 of the second cup 46 at an attachment point 64 located at a bottom end 66 of the outside edge 60 of the second cover 58.

The second cover 58 has a groove 68 that is recessed into the back surface 62 of the second cover 58 and the groove 68 associated with the second cover 58 extends around a full circumference of the outside edge 60 of the second cover 58. The groove 68 associated with the second cover 58 insertably receives the forward end 50 of the second cup 46 when the second cover 58 is closed. In this way a lateral bounding surface 70 of the groove 68 associated with the second cover 58 frictionally engages the inside surface 27 of the outside wall 22 of the second cup 46 for retaining the second cover 58 in the closed position. The second cover 58 has a second lobe 72 extending away from the outside edge 60 of the second cover 58 thereby facilitating the second lobe 72 to be gripped for urging the second cover 58 into the open position. Additionally, the second lobe 72 is aligned with a top end 74 of the outside edge 60 of the second cover 58.

A member 76 is coupled between the first cup 12 and the second cup 46 such that the first cup 12 and the second cup 46 are spaced apart from each other. The member 76 has a first end 78 and a second end 80; the first end 78 is coupled to the outside wall 22 of the first cup 12 and the first end 78 is aligned with the back end 20 of the first cup 12. The second end 80 is coupled to the outer wall 54 of the second cup 46 and the second end 80 is aligned with the rear end 52 of the second cup 46. The member 76 may be comprised of a deformable and fluid impermeable material similar to that which each of the first cup 12 and the second cup 46 are comprised.

In use, the first cup 12 is positioned over the deadbolt 14 and the second cup 46 is positioned over the doorknob 48. The first flap 26 inhibits the first cup 12 from falling off of the deadbolt 14 and the second flap 56 inhibits the second cup 46 from falling off of the doorknob 48. In this way the first cup 12 and the second cup 46 inhibit condensation, and other sources of moisture, from collecting within the deadbolt 14 and the doorknob 48 which could subsequently render the deadbolt 14 and the doorknob 48 inoperable due to freezing. Each of the first cover 28 and the second cover 58 facilitate the deadbolt 14 and the doorknob 48 to be fully enclosed within the respective first cup 12 and second cup 46. Additionally, the first cover 28 and the second cover 58 can be opened to facilitate either the deadbolt 14 or the doorknob 48 to be accessed to either lock or unlock the deadbolt 14 and to facilitate the doorknob 48 to be manipulated to open the door 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A deadbolt covering device for inhibiting condensation from collecting within a deadbolt and subsequently rendering the deadbolt inoperable due to freezing, said device comprising:

a first cup being positionable over a deadbolt of a door, said first cup being comprised of a fluid impermeable material wherein said first cup is configured to inhibit condensation from collecting within said deadbolt and subsequently rendering said deadbolt inoperable due to freezing;

a first cover being movably attached to said first cup, said first cover being positionable in a closed position thereby facilitating said first cover and said first cup to enclose said deadbolt, said first cover being positionable in an open position thereby exposing said deadbolt, said first cover being comprised of a fluid impermeable material wherein said first cover is configured to inhibit condensation from collecting within said deadbolt and subsequently rendering said deadbolt inoperable due to freezing;

a second cup being positionable over a doorknob of said door, said second cup being comprised of a fluid impermeable material wherein said second cup is configured to inhibit condensation from collecting within said doorknob and subsequently rendering said doorknob inoperable due to freezing;

a second cover being movably attached to said second cup, said second cover being positionable in a closed position thereby facilitating said second cover and said second cup to enclose said doorknob, said second cover being comprised of a fluid impermeable material wherein said second cup is configured to inhibit condensation from collecting within said doorknob and subsequently rendering said doorknob inoperable due to freezing, said second cover being positionable in an open position thereby exposing said doorknob; and a member being coupled between said first cup and said second cup such that said first cup and said second cup are spaced apart from each other.

2. The assembly according to claim 1, wherein:

said first cup has a front end and a back end and an outside wall extending between said front end and said back end, each of said front end and said back end being open thereby facilitating said back end to insertably receive said deadbolt having said back end resting against an outside surface of said door such that said outside wall surrounds said deadbolt, said outside wall angling inwardly between said back end and said front end such that said first cup has a frusto-conical shape; and said first cup has a first flap extending away from an inside surface of said outside wall, said first flap extending around a full circumference of said outside wall, said first flap being positioned closer to said back end than said front end, said first flap angling toward said front end such that said first flap frictionally engages said deadbolt thereby inhibiting said first cup from being removed from said deadbolt, said first flap being comprised of a deformable material thereby facilitating said first cup to be removed from said deadbolt when sufficient force is applied to said first cup to pull said first cup away from said deadbolt.

3. The assembly according to claim 2, wherein said first cover has an outer edge and a rear surface, said outer edge being attached to said front end of said first cup at an attachment point located at a top end of said outer edge of said first cover, said first cover having a groove being recessed into said rear surface of said first cover, said groove extending around a full circumference of said outer edge of said first cover, said groove insertably receiving said front end of said first cup when said first cover is closed such that a lateral bounding surface of said groove frictionally engages said inside surface of said outside wall of said first cup for retaining said first cover in said closed position.

4. The assembly according to claim 3, wherein said first cover has a first lobe extending away from said outer edge of said first cover thereby facilitating said first lobe to be gripped for urging said first cover into said open position, said first lobe being aligned with a bottom end of said outer edge.

5. The assembly according to claim 1, wherein:

said second cup has a forward end and a rear end and an outer wall extending between said forward end and said rear end, each of said forward end and said rear end being open thereby facilitating said rear end to insertably receive said doorknob having said rear end resting against said outer surface of said door such that said outer wall surrounds said doorknob, said outer wall angling inwardly between said rear end and said forward end such that said second cup has a frusto-conical shape;

said first cup includes a first flap; and said second cup has a second flap extending away from an inside surface of said outer wall, said second flap extending around a full circumference of said outer wall, said second flap being positioned closer to said rear end than said forward end, said second flap angling toward said forward end such that said second flap frictionally engages said doorknob thereby inhibiting said second cup from being removed from said doorknob, said second flap being comprised of a deformable material thereby facilitating said second cup to be removed from said doorknob when sufficient force is applied to said second cup to pull said second cup away from said doorknob.

6. The assembly according to claim 5, wherein said second cover has an outside edge and a back surface, said outside edge being attached to said forward end of said second cup at an attachment point located at a bottom end of said outside edge of said second cover, said second cover having a groove being recessed into said back surface of said second cover, said groove associated with said second cover extending around a full circumference of said outside edge of said second cover, said groove associated with said second cover insertably receiving said forward end of said second cup when said second cover is closed such that a lateral bounding surface of said groove associated with said second cover frictionally engages said inside surface of said outside wall of said second cup for retaining said second cover in said closed position.

7. The assembly according to claim 6, wherein said second cover has a lobe extending away from said outside edge of said second cover thereby facilitating said lobe to be gripped for urging said second cover into said open position, said lobe being aligned with a top end of said outside edge of said second cover.

8. The assembly according to claim 1, wherein:

said first cup has an outside wall and a back end;

said second cup has an outer wall and a rear end; and said member has a first end and a second end, said first end being coupled to said outside wall of said first cup, said first end being aligned with said back end of said first cup, said second end being coupled to said outer wall of said second cup, said second end being aligned with said rear end of said second cup.

9. A deadbolt covering device for inhibiting condensation from collecting within a deadbolt and subsequently rendering the deadbolt inoperable due to freezing, said device comprising:

a first cup being positionable over a deadbolt of a door, said first cup being comprised of a fluid impermeable material wherein said first cup is configured to inhibit condensation from collecting within said deadbolt and subsequently rendering said deadbolt inoperable due to freezing, said first cup having a front end and a back end and an outside wall extending between said front end and said back end, each of said front end and said back end being open thereby facilitating said back end to insertably receive said deadbolt having said back end resting against an outside surface of said door such that said outside wall surrounds said deadbolt, said outside wall angling inwardly between said back end and said front end such that said first cup has a frusto-conical shape, said first cup having a first flap extending away from an inside surface of said outside wall, said first flap extending around a full circumference of said outside wall, said first flap being positioned closer to said back end than said front end, said first flap angling toward said front end such that said first flap frictionally engages said deadbolt thereby inhibiting said first cup from being removed from said deadbolt, said first flap being comprised of a deformable material thereby facilitating said first cup to be removed from said deadbolt when sufficient force is applied to said first cup to pull said first cup away from said deadbolt;

a first cover being movably attached to said first cup, said first cover being positionable in a closed position thereby facilitating said first cover and said first cup to enclose said deadbolt, said first cover being positionable in an open position thereby exposing said deadbolt, said first cover being comprised of a fluid impermeable material wherein said first cover is configured to inhibit condensation from collecting within said deadbolt and subsequently rendering said deadbolt inoperable due to freezing, said first cover having an outer edge and a rear surface, said outer edge being attached to said front end of said first cup at an attachment point located at a top end of said outer edge of said first cover, said first cover having a groove being recessed into said rear surface of said first cover, said groove extending around a full circumference of said outer edge of said first cover, said groove insertably receiving said front end of said first cup when said first cover is closed such that a lateral bounding surface of said groove frictionally engages said inside surface of said outside wall of said first cup for retaining said first cover in said closed position, said first cover having a first lobe extending away from said outer edge of said first cover thereby facilitating said first lobe to be gripped for urging said first cover into said open position, said first lobe being aligned with a bottom end of said outer edge;

a second cup being positionable over a doorknob of said door, said second cup being comprised of a fluid impermeable material wherein said second cup is configured to inhibit condensation from collecting within said doorknob and subsequently rendering said doorknob inoperable due to freezing, said second cup having a forward end and a rear end and an outer wall extending between said forward end and said rear end, each of said forward end and said rear end being open thereby facilitating said rear end to insertably receive said doorknob having said rear end resting against said outer surface of said door such that said outer wall surrounds said doorknob, said outer wall angling inwardly between said rear end and said forward end such that said second cup has a frusto-conical shape, said second cup having a second flap extending away from an inside surface of said outer wall, said second flap extending around a full circumference of said outer wall, said second flap being positioned closer to said rear end than said forward end, said second flap angling toward said forward end such that said second flap frictionally engages said doorknob thereby inhibiting said second cup from being removed from said doorknob, said second flap being comprised of a deformable material thereby facilitating said second cup to be removed from said doorknob when sufficient force is applied to said second cup to pull said second cup away from said doorknob;

a second cover being movably attached to said second cup, said second cover being positionable in a closed position thereby facilitating said second cover and said second cup to enclose said doorknob, said second cover being comprised of a fluid impermeable material wherein said second cup is configured to inhibit condensation from collecting within said doorknob and subsequently rendering said doorknob inoperable due to freezing, said second cover being positionable in an open position thereby exposing said doorknob, said second cover having an outside edge and a back surface, said outside edge being attached to said forward end of said second cup at an attachment point located at a bottom end of said outside edge of said second cover, said second cover having a groove being recessed into said back surface of said second cover, said groove associated with said second cover extending around a full circumference of said outside edge of said second cover, said groove associated with said second cover insertably receiving said forward end of said second cup when said second cover is closed such that a lateral bounding surface of said groove associated with said second cover frictionally engages said inside surface of said outside wall of said second cup for retaining said second cover in said closed position, said second cover having a second lobe extending away from said outside edge of said second cover thereby facilitating said second lobe to be gripped for urging said second cover into said open position, said second lobe being aligned with a top end of said outside edge of said second cover; and a member being coupled between said first cup and said second cup such that said first cup and said second cup are spaced apart from each other, said member having a first end and a second end, said first end being coupled to said outside wall of said first cup, said first end being aligned with said back end of said first cup, said second end being coupled to said outer wall of said second cup, said second end being aligned with said rear end of said second cup.

* * * * *